(12) United States Patent
Guo

(10) Patent No.: US 11,385,510 B1
(45) Date of Patent: Jul. 12, 2022

(54) TWO-PIECE LCD PROJECTOR OPTICAL SYSTEM

(71) Applicant: NANHUA INTELLIGENT PRECISION MACHINE (SHENZHEN) CO., LTD., Guangdong (CN)

(72) Inventor: Hanwen Guo, Guangdong (CN)

(73) Assignee: NANHUA INTELLIGENT PRECISION MACHINE (SHENZHEN) CO., LTD., Guangdong (CN)

( * ) Notice: Subject to any disclaimer, the term of this patent is extended or adjusted under 35 U.S.C. 154(b) by 0 days.

(21) Appl. No.: 17/315,186

(22) Filed: May 7, 2021

(30) Foreign Application Priority Data

Mar. 16, 2021 (CN) .......................... 202110283704.4

(51) Int. Cl.
  *H04N 9/31* (2006.01)
  *G02F 1/1347* (2006.01)
  *G03B 21/00* (2006.01)

(52) U.S. Cl.
  CPC ....... *G02F 1/13473* (2013.01); *G03B 21/006* (2013.01); *H04N 9/312* (2013.01); *H04N 9/3105* (2013.01); *H04N 9/3164* (2013.01)

(58) Field of Classification Search
  CPC .... H04N 9/312; H04N 9/3105; H04N 9/3167; H04N 9/3164; H04N 9/31; G03B 21/006; G02F 1/13473; G02B 27/10
  USPC .......... 348/744, 750, 751, 756, 757; 353/20, 353/29–31, 37, 50, 94, 98, 99; 359/237, 359/641
  See application file for complete search history.

(56) References Cited

U.S. PATENT DOCUMENTS

2020/0387064 A1* 12/2020 Guo ..................... G03B 21/006
2020/0389633 A1* 12/2020 Guo ................... G03B 21/2066

* cited by examiner

*Primary Examiner* — Sherrie Hsia

(57) ABSTRACT

A two-piece LCD (Liquid Crystal Display) projector optical system includes a LCD light valve with red and green sub-pixels, a black and white LCD light valve, an illumination device with a red-green combined beam, an illumination device with a blue beam, a beam combiner, a projection lens and a light valve electric driver. The emitted red-green combined beam passes through the LCD light valve and then is transmitted to the beam combiner; the emitted blue beam passes through the black and white LCD light valve and then is transmitted to the beam combiner; the beam combiner combines the beams from the LCD light valve and the black and white LCD light valve, and then the combined beam is transmitted to the projection lens. The optical system lengthens a service life of the projector, improves an output brightness of the projector, and increases satisfaction of users.

1 Claim, 3 Drawing Sheets

TWO-PIECE LCD PROJECTOR OPTICAL SYSTEM

CROSS REFERENCE OF RELATED APPLICATION

The application claims priority under 35 U.S.C. 119(a-d) to CN 202110283704.4, filed Mar. 16, 2021.

BACKGROUND OF THE PRESENT INVENTION

Field of Invention

The present invention relates to a technical field of projector, and more particularly to a two-piece LCD (Liquid Crystal Display) projector optical system.

Description of Related Arts

After entering the time of solid cold light source such as LED (Light Emitting Diode), the projector is always subject to the technical limitations. Under the premise that the image meets the ratio requirement of three primary colors of the white balance, the luminous efficiency and the energy density (radiant power of light source/light-emitting area of light source) of the red and blue light sources are both much higher than that of the green light source. Therefore, the output brightness of the projector is mainly determined by the efficiency or energy density of the green light source. Thus, the brightness bottleneck of the conventional projector is how to improve the brightness of the green primary component in the output image as far as possible.

Referring to the Chinese patent application of CN201910490596.0, in order to improve the output brightness of the projector, a two-piece LCD (Liquid Crystal Display) projector is provided, as shown in FIG. 3, wherein: the illumination device 5' with the green beam illuminates the black and white LCD light valve 2' to generate a green image; the illumination device 4' with the red-blue combined beam illuminates the LCD light valve 1' with the red and blue sub-pixels to generate the red and blue images; the beams are combined through the beam combiner 3' and projected through the projection lens 6'. The green beam has an independent illumination imaging channel; because the LCD light valve 2' has no masking loss caused by CF (Color Filter), the brightness of the green primary component in the output image is ensured as far as possible; the red beam and the blue beam are combined in one illumination imaging channel; although the red and blue color filters corresponding to the red and blue sub-pixels respectively mask the corresponding areas and a loss of 50% of the beam is caused (actually, the loss is far more than 50%), the output brightness of the projector is still significantly improved. The two-piece LCD projector has the significant advantages of high efficiency and high brightness and achieves the considerable innovation and breakthrough.

With the scientific and technological progress and the significant improvement of the luminous efficiency of the green light source, the shortcomings of the two-piece LCD projector also become significant. Referring to FIG. 4, each pixel P' of the LCD light valve 1' comprises a red sub-pixel R' (can also be understood as the red film or the red resistance) and a blue sub-pixel B', wherein: the red sub-pixel R' is for resisting the blue beam in the illuminating beam and transmitting the red beam, while the blue sub-pixel B' is for resisting the red beam in the illuminating beam and transmitting the blue beam, causing the loss of 50% of the illuminating beam. Considering the inherent loss of the BM (Black Matrix, not shown in FIG. 4) between the pixels and the sub-pixels, the actual loss of the LCD light valve 1' is far more than 50%. Taking the FHD (Full High Definition) light valve with a size of 2.2 inches and a BM line width of 3.5 μm as an example, the masking loss of the BM is about 37.4%; the sub-pixels R' and B' respectively resist the corresponding beams; and finally, the total transmitting efficiency of the LCD light valve 1' is about 31.3%.

Referring to FIG. 3, the black and white LCD light valve 2' also has the FHD resolution of 2.2 inches and the BM line width of 3.5 μm, and the masking loss of the BM is about 25.5% (compared with the LCD light valve 1', the number of the columns of the BM in the horizontal direction is reduced by half), so that the total transmitting efficiency of the LCD light valve 2' is about 74.5%.

If the ratio of three primary colors of the white balance in the output image of the projector is 1:1:1 (dimensionless), the required quantity of 1 part of green beam corresponds to 2.38 parts of blue beam, and so on.

In order to achieve the higher output brightness of the projector, the required quantity of the blue beam is more. However, for the whole optical system, in the 2.38 parts of blue beam, 68.7% of the blue beam does useless work. The shorter wavelength of the beam or the higher proportion of the short-wavelength beam (with the boundary of about 460 nm, the photochemical and electrochemical damages of the green and red beams are smaller than that of the blue beam, by 2-3 orders of magnitude) will cause the larger photochemical and electrochemical damages to the materials of the projector optical system, such as the plastic optical element (for example, the plastic lens), the optical glass of some marks, the optical film (for example, the anti-reflective film and the dichroic film), the transistor array of the LCD light valve, the color filter, the BM, the liquid crystal, the alignment film and the polarizer. For one projector having the specific resistance to the photochemical and electrochemical damages, considering the product durability and the quality of the blue beam, the output brightness of the conventional two-piece LCD projector is greatly limited.

For further improving the output brightness of the conventional two-piece LCD projector, the preferred technical solution is not to improve the brightness of the green primary beam any more, but to reduce the quantity of the blue primary beam, namely improving the efficiency of the illumination imaging channel of the blue beam, so that the total required quantity of the blue beam is reduced and the photochemical and electrochemical damages of the blue beam are decreased. Therefore, under the premise of guaranteeing the white balance of the projected image, how to improve the output brightness of the projector and how to reduce the quantity of the blue beam in the optical system as far as possible for decreasing the photochemical and electrochemical damages of the blue beam have become the problems need to be urgently solved by persons skilled in the art.

SUMMARY OF THE PRESENT INVENTION

In order to overcome deficiencies in prior art, the present invention provides a two-piece LCD (Liquid Crystal Display) projector optical system. The optical system provided by the present invention greatly reduces a loss and a required quantity of a blue beam, thereby significantly decreasing photochemical and electrochemical damages of the blue beam to optical materials of the projector optical system, lengthening a service life of the projector, improving an output brightness of the projector, and increasing satisfaction of users.

In order to accomplish the above object, the present invention provides a two-piece LCD projector optical system, comprising a LCD light valve with red and green sub-pixels, a black and white LCD light valve, an illumination device with a red-green combined beam, an illumination device with a blue beam, a beam combiner, a projection lens and a light valve electric driver, wherein:

the light valve electric driver transmits a blue field image in an input video signal to the black and white LCD light valve and synchronously transmits a red field image and a green field image to the LCD light valve;

the red-green combined beam emitted by the illumination device passes through the LCD light valve and then is transmitted to the beam combiner; the blue beam emitted by the illumination device passes through the black and white LCD light valve and then is transmitted to the beam combiner; the beam combiner combines the beams from the LCD light valve and the black and white LCD light valve, and then the combined beam is transmitted to the projection lens and projected.

According to the present invention, after decoding the input video signal of the projector, the light valve electric driver extracts the blue field image, transmits to the black and white LCD light valve, and drives the black and white LCD light valve to image, and synchronously extracts the red field image and the green field image, transmits to the LCD light valve, and drives the red and green sub-pixels on the LCD light valve to image, so as to realize full-color image display. In the present invention, the blue beam has the independent illumination imaging channel, without the masking loss caused by the color filter, so that the optical system provided by the present invention greatly reduces the loss and the required quantity of the blue beam, significantly decreases the photochemical and electrochemical damages of the blue beam to the optical elements of the projector optical system, lengthens the service life of the projector, and increases the satisfaction of the users. The red beam and the green beam are combined in one illumination imaging channel; the red and green color filters corresponding to the red and green sub-pixels respectively mask the corresponding areas, causing the loss of the beam; however, the wavelength ranges of the red beam and the green beam are both relatively far away from the wavelength range of the blue beam, so that the photochemical and electrochemical damages to the optical materials of the optical system are small, thereby effectively improving the output brightness of the projector provided by the present invention.

BRIEF DESCRIPTION OF THE DRAWINGS

To illustrate the technical solutions in the embodiments of the present invention or in the prior art more clearly, the accompanying drawings for describing the embodiments or the prior art are simply described as follows. Apparently, the accompanying drawings in the following description are only some embodiments of the present invention, and persons of ordinary skill in the art can derive other drawings from the accompanying drawings without creative efforts.

DETAILED DESCRIPTION OF THE PREFERRED EMBODIMENT

Figure 1:
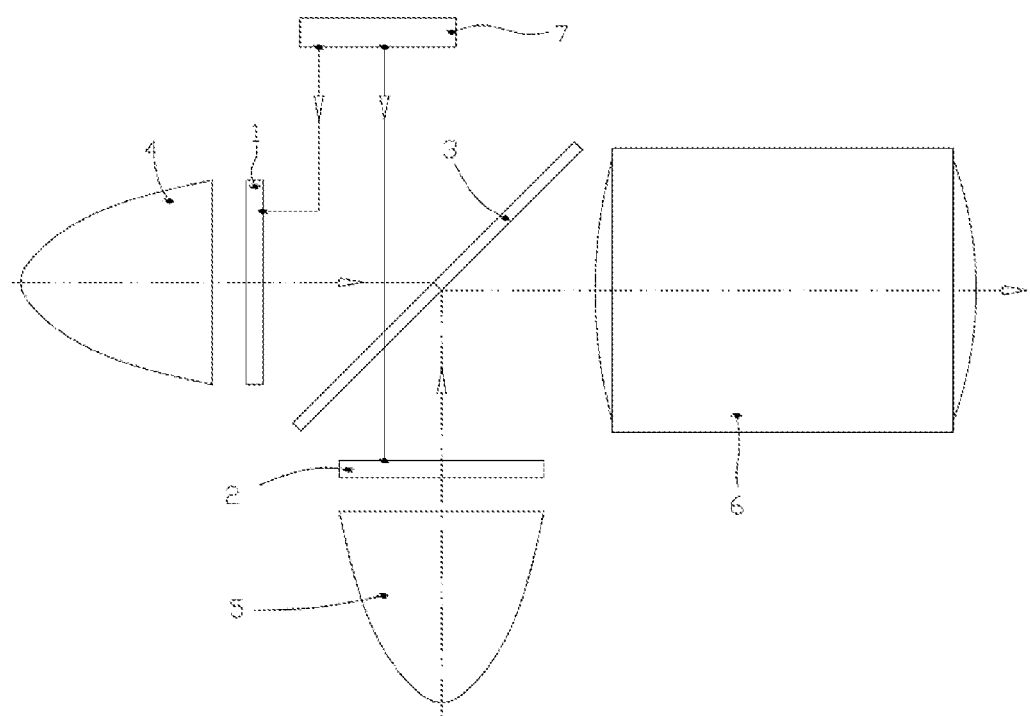
FIG. 1 is a simplified sketch view of a two-piece LCD (Liquid Crystal Display) projector optical system according to a preferred embodiment of the present invention.

In order to make one of ordinary skill in the art better understand the technical solutions of the present invention, the present invention is described in detail with the accompanying drawings as follows. The description of the preferred embodiment is exemplary and interpretive, not for limiting the protection scope of the present invention.

It should be noted that: the similar reference characters and letters in the drawings represent the similar elements. Thus, once one element is defined in one drawing, there is no need to further define and explain the element in the subsequent drawings.

It should be noted that: the directions or positional relationships indicated by the terms such as "center", "up", "down", "left", "right", "vertical", "horizontal", "inner" and "outer" are the directions or positional relationships based on the drawings, or the usual directions or positional relationships when using. These terms are only for conveniently describing the present invention and simplifying the description, not for indicating or implying the specific direction and the structure and operation in the specific direction of the devices or elements. Thus, these terms cannot be interpreted as the limitations to the present invention. Moreover, the terms such as "first", "second" and "third" are only for distinguishing, not for indicating or implying the relative importance.

Moreover, the terms such as "horizontal", "vertical" and "suspended" do not represent that the parts must be absolutely horizontal or suspended, but can tilt slightly. For example, the term of "horizontal" only represents that the direction is more horizontal relative to the term of "vertical", and does not represent that the structure must be completely horizontal, but can tilt slightly.

In the description of the present invention, it should be also noted that: except clearly defined and limited, the terms of "arrange", "mount", "link" and "connect" should be understood broadly. For example, the connection can be fixed connection, detachable connection or integrated connection; the connection can be mechanical connection or electric connection; the connection can be direct connection, indirect connection through the medium, or the interconnection between the two elements. One of ordinary skill in the art can understand the concrete meanings of the above terms in the present invention according to the specific situation.

Referring to FIG. 1, according to the preferred embodiment of the present invention, a two-piece LCD (Liquid Crystal Display) projector optical system is provided, comprising a LCD light valve 1 with red and green sub-pixels, a black and white LCD light valve 2, an illumination device 4 with a red-green combined beam, an illumination device 5 with a blue beam, a beam combiner 3, a projection lens 6 and a light valve electric driver 7.

The light valve electric driver 7 transmits a blue field image in an input video signal to the black and white LCD light valve 2 and drives pixels on the black and white LCD light valve 2 to image, and synchronously transmits a red field image and a green field image to the LCD light valve 1 and drives the red sub-pixels and the green sub-pixels on the LCD light valve 1 to image, so as to realize full-color image display. At present, the light valve electric driver 7 generally adopts a high cost-performance chip such as V53 and V56 chips of MStar Semiconductor, Inc., for completing decode conversion of each input video signal (such as HDMI (High Definition Multimedia Interface), VGA (Video Graphics Array) and Video) to LVDS (Low-Voltage Differential Signaling) output, then separating a blue field LVDS through a FPGA (Field Programmable Gate Array) circuit, transmitting the blue field LVDS to the black and white LCD light valve 2, and synchronously transmitting a red field LVDS and a green field LVDS to the LCD light valve 1.

The red-green combined beam emitted by the illumination device 4 passes through the LCD light valve 1 and then is transmitted to the beam combiner 3; the blue beam emitted by the illumination device 5 passes through the black and white LCD light valve 2 and then is transmitted to the beam combiner 3; the beam combiner 3 combines the beams from the LCD light valve 1 and the black and white LCD light valve 2, and then the combined beam is transmitted to the projection lens 6 and projected through the projection lens 6 for imaging.

Figure 3:
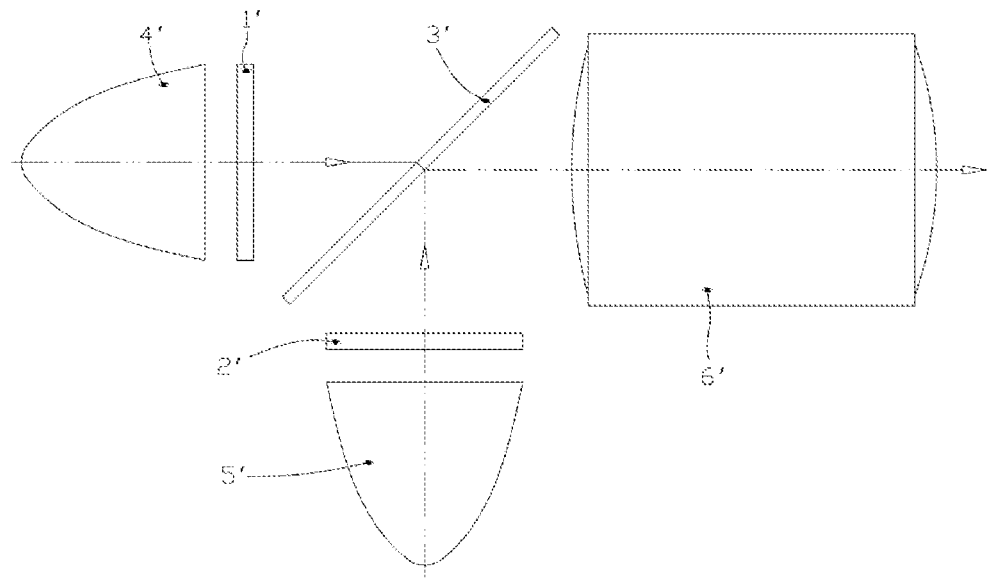
FIG. 3 is a structural sketch view of a two-piece LCD projector in prior art.
Figure 4:
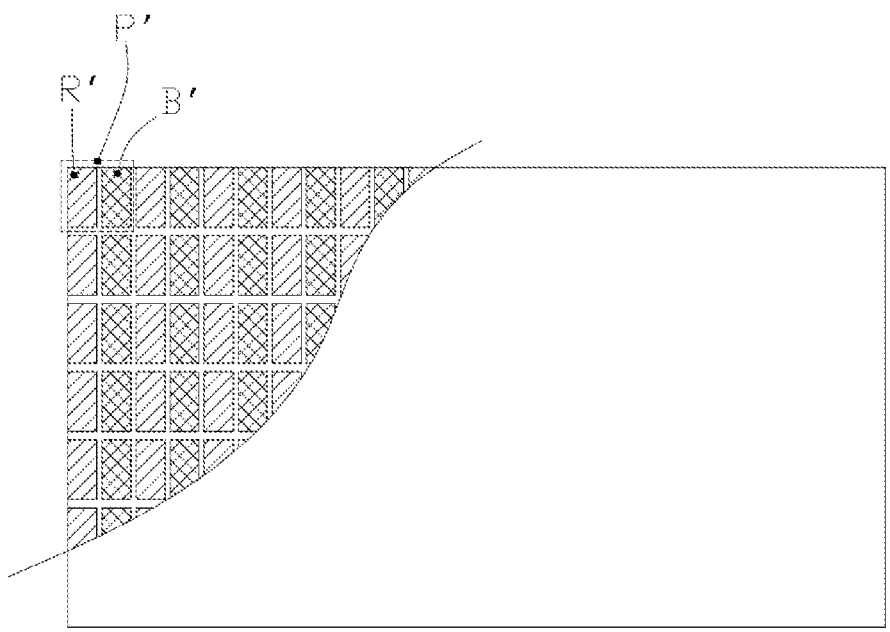
FIG. 4 is a structural sketch view of a LCD light valve in prior art.

In the preferred embodiment, the blue beam has an independent illumination imaging channel; the black and white LCD light valve 2 has no color filter, and therefore there is no masking loss caused by the color filter; meanwhile, a masking area of BM (Black Matrix) is reduced by half in the horizontal direction (compared with the LCD light valve 1); compared with the conventional two-piece LCD projector shown in FIGS. 3 and 4, when outputting the same brightness with the FHD (Full High Definition) resolution of 2.2 inches and the BM line width of 3.5 µm, the conventional two-piece LCD projector shown in FIGS. 3 and 4 requires 2.38 parts of blue beam, while the preferred embodiment of the present invention only requires 1 part of blue beam; the optical system provided by the preferred embodiment greatly reduces the loss and the required quantity of the blue beam, significantly decreases the photochemical and electrochemical damages of the blue beam to the optical elements of the projector optical system, lengthens the service life of the projector, and increases the satisfaction of the users.

Figure 2:
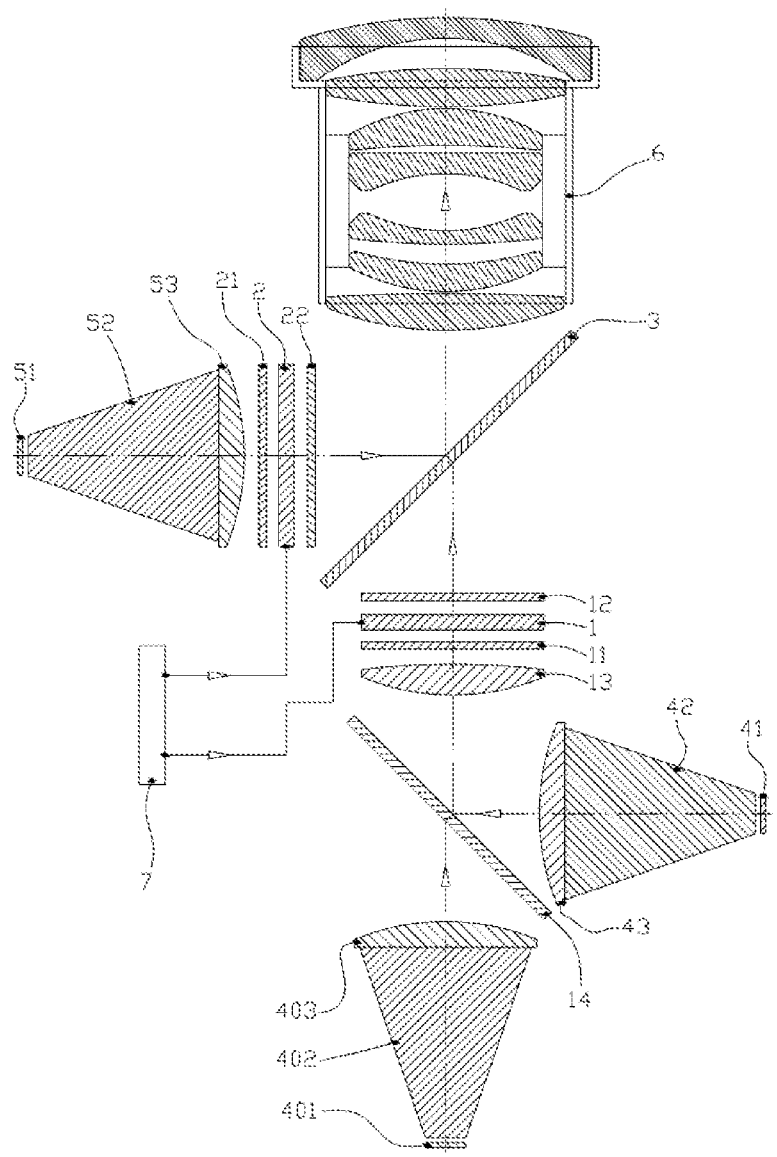
FIG. 2 is a structural sketch view of the two-piece LCD projector optical system according to the preferred embodiment of the present invention.

The illumination device 5 with the blue beam can be realized in various ways. For example, the high cost-performance way adopted by the preferred embodiment uses a blue LED (Light Emitting Diode) light source, a beam condenser and a collimating (or focusing) device, for conducting Kohler illumination or critical illumination on the black and white LCD light valve 2. Referring to FIG. 2, the light source adopts a blue LED light source 51, the beam condenser adopts a pyramid (also called "V-shaped") beam condenser 52, and a collimating lens 53 is arranged on an emergent plane of the pyramid beam condenser 52, so as to constitute a high cost-performance illumination device 5 with the blue beam, for conducting Kohler illumination on the black and white LCD light valve 2. The blue polarizing device 21 and the blue analyzer 22 are essential parts for LCD imaging; for the low brightness projector (for example, with the output brightness below 200 lm), the blue polarizing device and the blue analyzer are generally directly produced on the incident plane and the emergent plane of the LCD light valve; for the high brightness projector, the blue polarizing device and the blue analyzer need to be independently mounted, for facilitating ventilation and heat dissipation of the polarizers which are the key raw materials of the blue polarizing device 21 and the blue analyzer 22.

In the preferred embodiment, the red beam and the green beam are combined in one illumination imaging channel; red and green color filters corresponding to the red and green sub-pixels respectively mask the corresponding areas, causing the loss of the beam; however, the wavelength ranges of the red beam and the green beam are both relatively far away from the wavelength range of the blue beam, so that the photochemical and electrochemical damages to the optical materials of the optical system are small, thereby effectively improving the output brightness of the projector in the preferred embodiment. The illumination device 4 with the red-green combined beam can also be realized in various ways. For example, with the red LED light source, the green LED light source and corresponding beam condensers, the emitted beams respectively pass through the collimating (or focusing) devices and then are combined through the beam combiner, for conducting Kohler illumination or critical illumination on the LCD light valve 1. Referring to FIG. 2, a green LED light source 41, a red LED light source 401, a green pyramid beam condenser 42, a red pyramid beam condenser 402, a green collimating lens 43, a red collimating lens 403, a beam combiner and a relay lens 13 constitute a high cost-performance illumination device 4 with the red-green combined beam, for conducting Kohler illumination on the LCD light valve 1; wherein: the green collimating lens 43 is arranged on an emergent plane of the green pyramid beam condenser 42; the red collimating lens 403 is arranged on an emergent plane of the red pyramid beam condenser 402; the beam combiner adopts a red-green beam combiner 14 (which is a glass plate with a dichroic beam splitting film produced thereon, having a thickness of 0.5 mm, for reflecting the green beam and transmitting the red beam); the emitted beams are combined through the beam combiner and then pass through the relay lens 13 (for improving the system efficiency, which is optional considering the cost). Similar, the polarizing device 11 and the analyzer 12 are essential parts for LCD imaging.

If the optical system provided by the preferred embodiment and the conventional two-piece LCD projector have the same bearing capacity of the blue beam, compared with the conventional two-piece LCD projector, the projector in the preferred embodiment outputs the higher brightness and achieves the further innovation and breakthrough, which increases the product competitiveness.

The basic principles, main features and advantages of the present invention are described above. One of ordinary skill in the art should know that: the present invention is not limited by the above preferred embodiment; the above preferred embodiment and the description in the specification are only for illustrating the principles of the present invention; various changes and improvements made without departing from the spirit and range of the present invention should be all encompassed in the protection scope of the present invention. The protection scope of the present invention is defined by the claims and the equivalents thereof

What is claimed is:

1. A two-piece LCD (Liquid Crystal Display) projector optical system, comprising a LCD light valve (1) with red and green sub-pixels, a black and white LCD light valve (2), an illumination device (4) with a red-green combined beam, an illumination device (5) with a blue beam, a beam combiner (3), a projection lens (6) and a light valve electric driver (7), wherein:

the light valve electric driver (7) transmits a blue field image in an input video signal to the black and white LCD light valve (2) and synchronously transmits a red field image and a green field image to the LCD light valve (1);

the red-green combined beam emitted by the illumination device (4) passes through the LCD light valve (1) and then is transmitted to the beam combiner (3); the blue beam emitted by the illumination device (5) passes through the black and white LCD light valve (2) and then is transmitted to the beam combiner (3); the beam combiner (3) combines the beams from the LCD light valve (1) and the black and white LCD light valve (2), and then the combined beam is transmitted to the projection lens (6) and projected.

\* \* \* \* \*